United States Patent [19]

Laudt

[11] Patent Number: 4,457,442
[45] Date of Patent: Jul. 3, 1984

[54] WIRING DIAGRAM POCKET FOR A SWITCHBOARD CABINET

[75] Inventor: Jurgen Laudt, Franzosenweg, Fed. Rep. of Germany

[73] Assignee: Rittal-Werk Rudolf Loh GmbH & Co. KG, Fed. Rep. of Germany

[21] Appl. No.: 401,349

[22] Filed: Jul. 23, 1982

[51] Int. Cl.³ .............................................. B65D 25/24
[52] U.S. Cl. ...................................... 220/18; 40/16.4; 248/67.7; 312/234
[58] Field of Search .................... 220/18, 3.5, 3.6, 3.9; 40/10 R, 16, 16.4, 17, 18, 124, 62; 312/234, 234.4, 249, 183, 185; 248/67.7; 229/34 HW

[56] References Cited

U.S. PATENT DOCUMENTS

| | | | |
|---|---|---|---|
| 262,793 | 8/1882 | Lang | 312/234 |
| 308,005 | 11/1884 | Steinebrei | 248/218.4 X |
| 1,161,955 | 11/1915 | Nicholas | 312/234.1 X |
| 1,447,600 | 3/1923 | Olevin | 220/62 X |
| 1,524,141 | 1/1925 | Kyle | 248/67.7 X |
| 1,862,530 | 6/1932 | Dickman | 40/16 R |
| 1,888,811 | 11/1932 | Talley | 40/16.4 |
| 2,068,083 | 1/1937 | Souter | 40/16.4 |
| 2,491,002 | 12/1949 | Domecki | 220/62 X |
| 2,530,781 | 11/1950 | Phillips | 312/234 X |
| 2,556,061 | 6/1951 | Buckels | 220/62 X |
| 2,909,590 | 10/1959 | Stanley | 248/67.7 X |
| 2,916,237 | 12/1959 | Bertling et al. | 248/67.7 |
| 3,255,913 | 6/1966 | Helm | 220/18 |
| 3,293,779 | 12/1966 | Vogeli, Sr. | 40/16.4 |
| 3,464,135 | 9/1969 | Eidinger | 40/10 R X |
| 3,539,094 | 11/1970 | O'Connor et al. | 229/34 HW |
| 3,620,404 | 11/1971 | Grasso | 220/18 |
| 3,744,706 | 7/1973 | Colantoni et al. | 229/34 HW |
| 4,140,293 | 2/1979 | Hansen | 248/217.2 |
| 4,223,965 | 9/1980 | Palandrani | 312/245 X |
| 4,341,339 | 7/1982 | Zore | 229/34 HW |

Primary Examiner—Allan N. Shoap
Assistant Examiner—Robert Petrik
Attorney, Agent, or Firm—Thomas W. Speckman

[57] ABSTRACT

This invention relates to a wiring diagram pocket for a switchboard cabinet essentially comprising a panel, the edges of which along its two vertical sides and its bottom are bent with multiple right angles forming abutment sections which extend at a distance from and parallel to the panel.

10 Claims, 4 Drawing Figures

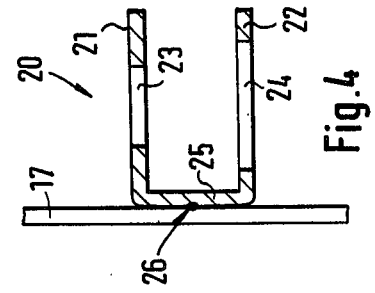
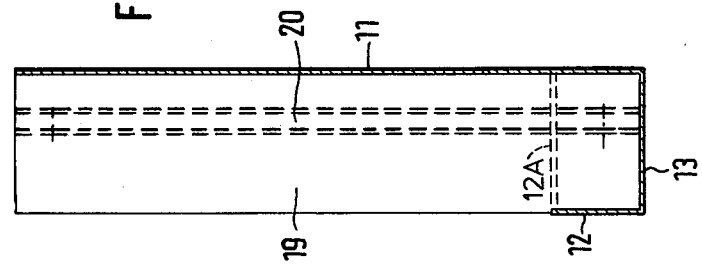
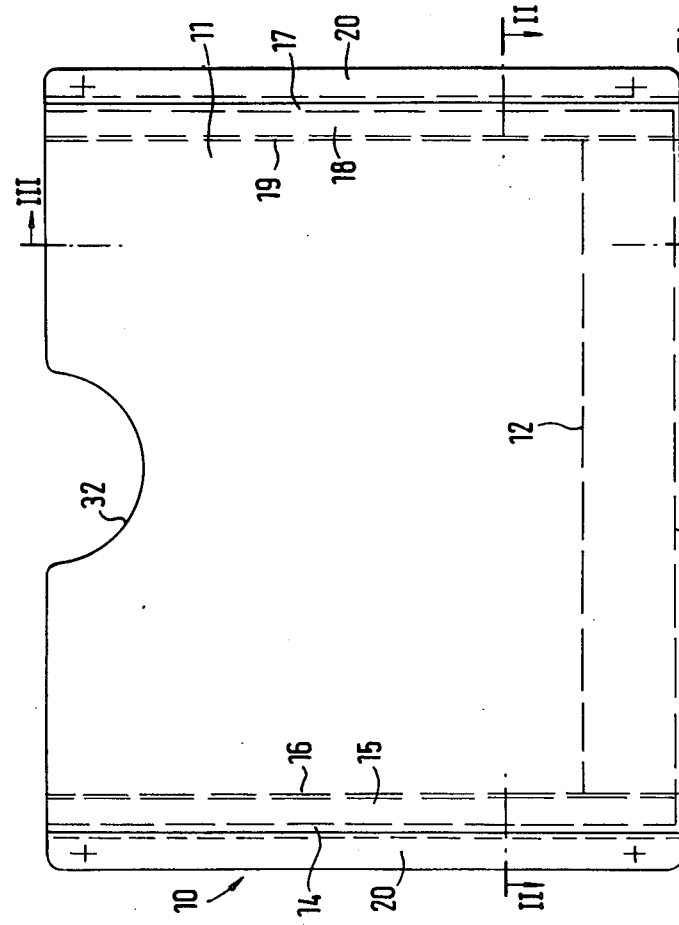
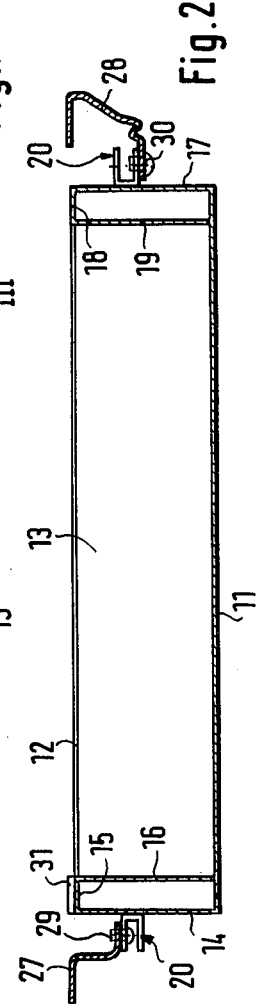

4,457,442

WIRING DIAGRAM POCKET FOR A SWITCHBOARD CABINET

BACKGROUND OF THE INVENTION

1. Field of the Invention

This invention relates to a wiring diagram pocket for a switchboard cabinet essentially comprising a panel, the edges of which along its two vertical sides and its bottom are bent with multiple right angles forming abutment sections which extend at a distance from and parallel to the panel.

2. Description of the Prior Art

Wiring diagram pockets are, as a rule, fixedly secured to the inside of the switchboard cabinet door, it having been proposed heretofore that they are secured to the inside of the door by means of their abutment sections. This type of fixed attachment of the wiring diagram pocket has the disadvantage that the inside of the switchboard door cabinet, which frequently has perforated bars for holding various structural elements and structural assemblies, and the like, is no longer freely available.

It is also known to provide the abutment sections of the wiring diagram pocket with self-adhesive tape so as to enable the wiring diagram pocket to be attached to any location on the inside of the switchboard cabinet door. However, this type of fastening has frequently been unsatisfactory and the wiring diagram pocket has become detached from the door.

SUMMARY OF THE INVENTION

It is the object of the present invention to provide a wiring diagram pocket of the aforementioned type which is adapted to be securely attached in various locations to the switchboard cabinet door and to be easily detachable and re-attachable to a different location on the switchboard cabinet door. This is accomplished in accordance with the invention by fastening elements provided on each vertical side of the panel. Such fastening elements are disposed perpendicular to the transitional sections which are vertical to the panel, and are spaced from and parallel to the abutment sections and are provided with holes at predetermined detention intervals.

If the particular spacing of the fastening elements thus disposed is coordinated with the spacing of the perforated bars on the inside of the switchboard cabinet door, the wiring diagram pocket can be secured in various locations to the two spaced perforated bars on the inside of the switchboard cabinet door. The width of the wiring diagram pocket need not be dimensioned to match the distance between the two perforated bars. It is sufficient that the wiring diagram pocket be secured by one or the other of the fastening elements, preferably by screws, to a perforated bar on either vertical side of the panel.

There are two common types of switchboard cabinets in which the perforated bars are disposed at different spacings from the inside of the cabinet door. To create a wiring diagram pocket which may be used with either of these different types of switchboard cabinets, one embodiment of this invention provides two fastening members on the outside of each transitional section, the fastening members extending parallel to each other and at different spacings from the abutment sections.

In accordance with another embodiment, the attachment of the fastening members to the wiring diagram pocket is simplified in that the two fastening members are combined in the region of a transitional section so as to form a U-section, the middle portion of which is welded to the exterior side of the transitional section.

In order to facilitate the screw connection between the fastening members facing the abutment sections and the perforated bars, another embodiment of the invention provides for the two fastening members forming a U-section to have holes which are in alignment with each other, with the diameter of the holes in the fastening member facing the panel being larger than the diameter of the holes in the fastening member facing the abutment sections.

To facilitate access to the wiring diagrams and the like deposited in the wiring diagram pocket, another embodiment of the invention provides for a semicircular cutout in the center of the upper edge of the panel.

In accordance with yet another embodiment, the bottom of the wiring diagram pocket is clearly defined by the lower panel edge being bent off in a square fashion, i.e. at two right angles, with the abutting face bent inwardly toward the panel surface.

According to a further embodiment, the vertical side sections of the wiring diagram pocket are stabilized and closed off toward the receiving space of the wiring diagram pocket in that the panel edge is bent on the two vertical sides at three right angles, with the abutting section being bent inwardly toward the panel face and the end sections extending up to the inner side of the panel. As an additional advantageous feature, the extreme edges of the inwardly bent end sections are joined to the inner side of the panel, preferably by welding, and the abutting edges of the abutment sections are also joined, preferably by welding, to each other.

The wiring diagram pocket may also be directly attached to inside of the switchboard cabinet door by providing the abutment sections or stops with a self-adhesive substance.

BRIEF DESCRIPTION OF THE DRAWING

The invention will be described in greater detail with reference to an exemplary embodiment illustrated in the drawings, in which:

FIG. 1 is a front view of a wiring diagram pocket according to one embodiment of this invention;

FIG. 2 is a sectional view taken along the line II—II of FIG. 1;

FIG. 3 is a sectional view taken along the line III—III of FIG. 1; and

FIG. 4 is a partial sectional view of a U-section comprising two fastening members, the U-section being joined to a transitional section of the wiring diagram pocket.

DESCRIPTION OF PREFERRED EMBODIMENTS

Referring to FIG. 1, the wiring diagram pocket 10 substantially comprises plate or panel 11. Centered in the upper edge of panel 11 is semicircular cutout 32 to facilitate access to the wiring diagrams and other material deposited in the pocket. As is shown in the sectional view of FIG. 3, the lower edge of panel 11 is angularly bent to form two 90° angles, with transitional section 13 determining the depth of wiring diagram pocket 10. Stop or abutment section 12 is parallel to and correspondingly spaced from panel 11 and constitutes the extreme element of wiring diagram pocket 10 on this side. As shown by dotted lines in FIG. 3, abutment section 12A may be bent inwardly toward panel 11. The two vertical sides of panel 11 are bent in a configuration of three right angles. As best seen in FIG. 2, transitional sections 14 and 17 are vertical to panel 11 and stops 15 and 18 adjacent to transitional sections 14 and 17, respectively, extend parallel to panel 11 and at a distance therefrom by which, again, the depth of the wiring diagram pocket is defined. End sections 16 and 19 are bent inwardly toward panel 11 and extend to the inner side of the panel 11. The extreme edges of end sections 16 and 19 may be joined to the inner side of the panel 11, preferably by welding. Also the butting edges of abutment sections 12, 15 and 18 may be joined to each other, preferably welded, making the wiring diagram pocket 10 a stable unit.

In order for wiring diagram pocket 10 to be connected to the perforated bars, the exterior faces of the transitional sections 14 and 17 may have U-sections 20 attached thereto. As is shown in FIG. 4, the two legs of the U-section 20 constitute two fastening members 21 and 22, the spacing of which from abutment sections 12, 15 and 18 being so coordinated with respect to the perforated bars 27 and 28 that fastening member 21 can be joined to perforated bar 27 by means of screw connection 29, and the fastening member 22 can be joined to perforated bar 28 by screw connection 30. Perforated bar 27 is spaced from the inside of the switchboard cabinet door a distance such as to enable fastening member 21, being positioned on the perforated bar 27, to be screwed to it. Perforated bar 28, however, is spaced at a greater distance from the inside of the switchboard cabinet door and extends around fastening element 22 of the U-section so that, being positioned on top of the U-section 20, it may be secured thereto by screws, as will be seen from the sectional view of FIG. 2. Abutment sections 12, 15 and 18 may also be provided on their exteriors with self-adhesive means 31 so that the wiring diagram pocket 10 may be attached to switchboard cabinet doors without perforated bars.

As will be seen from the enlarged partial section of FIG. 4, fastening elements 21 and 22 of U-section 20 are provided with holes 23 and 24 in alignment with each other. Holes 23 and 24 are spaced at intervals according to a predetermined detent measure which preferably is a whole multiple of the perforation intervals on perforation bars 27 and 28. The result is that circuit diagram pocket 10 may be positively attached to either perforated bar 27 or 28 by means of two screw connections 29 and 30 and a single fastening element 21 or 22. The location of wiring diagram pocket 10 on the perforated bar may be at distances freely determined by the perforation spacings of the perforated bars. The partial sectional view of FIG. 4 indicates that the diameter of holes 24 in fastening member 22 facing panel 11 is larger than the diameter of holes 23 in fastening member 21 facing abutment sections 12, 15 and 18. This permits the use of head screws in making the screw connections 29 between perforated bar 27 and fastening member 21. The U-section 20 is secured at its center portion 25 to the corresponding transitional section, for example 17, of wiring diagram pocket 10 by welding, as is indicated by the spot weld 26.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A wiring diagram pocket for a switchboard cabinet, comprising a panel which is bent along its two vertical sides and its bottom edge at multiple right angles and in the bent regions is provided with elongated abutting sections parallel with and spaced from the panel by transitional portions for the purpose of abutting an adjacent supporting surface, characterized in that parallel fastening members (21, 22) are combined with a center portion (25) to form a U-section (20) the middle portion of which is welded to the exterior of said transitional portion (14, 17) on each vertical side of said panel (11) disposed perpendicularly on the exterior side of said transitional portions (14, 17) extending vertically to said panel (11), and that said fastening members (21, 22) are spaced at different distances from said abutting sections (12, 15, 18) and provided with holes (23, 24) at predetermined intervals in alignment with each other, the diameter of holes (24) in said fastening member (22) closer to said panel (11) are larger than the diameter of holes (23) in said fastening member (22) closer to said abutment sections (12, 15, 18).

2. Wiring diagram pocket according to claim 1, characterized in that the upper edge of said panel (11) is provided in its center with a semicircular cutout (32).

3. Wiring diagram pocket according to claim 1 characterized in that said panel (11) is bent off twice at right angles, forming said abutting sections (12, 15, 18).

4. Wiring diagram pocket according to claim 1, characterized in that said panel (11) on each of its vertical sides is bent off three times at right angles, having abutment sections (15, 18) being bent inwardly toward said panel face (11), and having inwardly bent end sections (16, 19) extending to the inner side of said panel (11).

5. Wiring diagram pocket according to claim 4, characterized in that said end edges of said inwardly bent end sections (16, 19) are joined to said inner side of the panel (11).

6. Wiring diagram pocket according to claim 1, characterized in that the abutting edges of said abutment sections (12, 15, 18) are joined to each other.

7. Wiring diagram pocket according to claim 1 characterized in that said abutment sections (12, 15, 18) are provided with self-adhesive means (31).

8. Wiring diagram pocket according to claim 5, characterized in that the abutting edges of said abutment sections (12, 15, 18) are joined to each other.

9. Wiring diagram pocket according to claim 1, characterized in that said panel (11) on its bottom side is bent off three times at right angles, having abutment section (12) being bent inwardly toward said panel face (11) and having inwardly bent section (12A).

10. Wiring diagram pocket according to claim 4, characterized in that said panel (11) on its bottom said is bent off three times at right angles, having abutment section (12) being bent inwardly toward said panel face (11) and having inwardly bent section (12A).

* * * * *